Patented Dec. 31, 1935

2,025,869

UNITED STATES PATENT OFFICE 2,025,869

SOLUTIONS OF ALKOXYPHENOLS

Walter Kropp, Wuppertal-Elberfeld, Germany, assignor to Winthrop Chemical Company, Inc., New York, N. Y., a corporation of New York No Drawing. Application February 7, 1935, Serial No. 5,499. In Germany February 10, 1934

17 Claims. (Cl. 167—65)

This invention relates to a composition of matter comprising aqueous solutions of alkoxyphenols which are suitable for injection purposes.

It is known in the art that the phenols mostly display a disinfecting action. The alkoxyphenols particularly are distinguished by their expectorating action. However, the peroral administration of the said phenol compounds is considerably impaired by their disagreeable taste and their irritating action. For parenteral administration particularly the alkoxyphenols are not sufficiently soluble at normal temperature.

In accordance with the present invention stable aqueous solutions of alkoxyphenols which contain a considerable percentage of the alkoxyphenols are obtainable by treating the alkoxyphenols with water-soluble 1-phenyl-2.3-dimethyl - 5 - pyrazolone - 4 - aminomethane - sulfonates or -sulfinates in the presence of water. In this process the said pyrazolone derivatives impart a relatively high solubility to the alkoxyphenols, so that solutions are obtainable which contain for instance from 7 to 25% of the alkoxyphenol, that is which contain the alkoxyphenols in a concentration which is desired for injection purposes. The water-soluble 1-phenyl-2.3-dimethyl - 5 - pyrazolone - 4 - aminomethane - sulfonates or -sulfinates which act as the solubilizing agent are advantageously used in a relatively high percentage, for instance, in a concentration of 30, 40 or even 50%.

The solutions thus obtainable have proved stable on storage. This behaviour of the solution is, of course, important as to its practical usefulness and it is surprising in view of the acid reaction of the alkoxyphenols since it is known that the N-methane-sulfonates or -sulfinates of the amino-substituted pyrazolones readily undergo a chemical change under acid reaction. The amino-substituted phenyl pyrazolones themselves do not exert a sufficiently solubilizing effect on the alkoxyphenols. Since the new solutions of the alkoxyphenols are also distinguished by good compatibility they have proved suitable for injection purposes.

The invention is further illustrated by the following examples without being restricted thereto:—

*Example 1.*—15 parts by weight of guaiacol are dissolved in 100 parts by weight of a 50% aqueous solution of the sodium salt of 1-phenyl-2.3-dimethyl - 5 - pyrazolone - 4 - methylaminomethane-sulfonic acid. The solution may be diluted with water as desired.

A similar preparation can be obtained when using 1-methyl-3-hydroxy-4-methoxybenzene instead of guaiacol.

Instead of 15 parts by weight also more, for instance, 25 parts by weight of guaiacol may be clearly dissolved in the above-mentioned solution.

*Example 2.*—10 parts by weight of ortho-ethoxyphenol are clearly dissolved in 100 parts by weight of a 40% aqueous solution of the sodium salt of 1-phenyl-2.3-dimethyl-5-pyrazolone-4-methylaminomethane-sulfonic acid.

Instead of the sodium salt also other salts, for instance, the lithium, ammonium or amine salts may be employed.

*Example 3.*—10 parts by weight of guaiacol are completely dissolved in 100 parts by weight of a 50% aqueous solution of the sodium salt of 1-phenyl - 2.3 - dimethyl - 5 - pyrazolone-4-methyl-aminomethane-sulfinic acid.

*Example 4.*—10 parts by weight of chloro- or bromo-guaiacol and 35 parts by weight of the sodium salt of 1-phenyl-2.3-dimethyl-5-pyrazolone-4-aminomethane-sulfonic acid yield a clear solution when water is added up to 100 cc.

*Example 5.*—10 parts by weight of eugenol are dissolved in 100 parts by weight of a 50% aqueous solution of the sodium salt of 1-phenyl-2.3-dimethyl-5-pyrazolone-4-aminomethane-sulfonic acid.

*Example 6.*—7.5 grams of pyrogallol-dimethylether, or of resorcinol-monobutylether, or 10 grams of hydroquinone-mono-methylether yield with 40 grams of the sodium salt of 1-phenyl-2.3-dimethyl - 5-pyrazolone-4-methylaminomethane-sulfonic acid on the addition of water to 100 cc. a clear solution.

The solutions described in the above examples may advantageously be combined with other medicinal ingredients, such as quinine and ephedrine. Such product may for instance be prepared from 9 grams of guaiacol, 40 grams of the sodium salt of 1-phenyl-2.3-dimethyl-5-pyrazolone - 4 - methylaminomethane-sulfonic acid, 1 gram of ephedrine and water to 100 cc.

Particularly effective are combinations of the aforementioned preparations with extracts which contain the anti-anaemic principle but are free from coagulable albumen substances. A very efficacious product for intramuscular injection is, for instance, obtained by combining 10 grams of guaiacol with 40 grams of the sodium salt of 1-phenyl - 2.3 - dimethyl - 5-pyrazolone-4-methyl-aminomethane-sulfonic acid, 5 grams of quinine-hydrochloride and so much of an aqueous liver extract as specified, so that 100 cc. of solution are obtained.

I claim:—

1. Composition of matter comprising in aqueous solution an alkoxyphenol and a water-soluble 1-phenyl-2.3-dimethyl-5-pyrazolone-4-aminomethane-sulfonate or -sulfinate.

2. Composition of matter comprising in aqueous solution an alkoxyphenol and a water-soluble 1-phenyl-2.3-dimethyl-5-pyrazolone-4-aminomethane alkali metal sulfonate or sulfinate.

3. Composition of matter comprising in aqueous solution an ortho-alkoxyphenol and a water-soluble 1-phenyl-2.3-dimethyl-5-pyrazolone-4-aminomethane-sulfonate or -sulfinate.

4. Composition of matter comprising in aqueous solution an ortho-alkoxyphenol and a water-soluble 1-phenyl-2.3-dimethyl-5-pyrazolone-4-aminomethane alkali metal sulfonate or sulfinate.

5. Composition of matter comprising in aqueous solution an ortho-alkoxyphenol and a water-soluble 1-phenyl-2.3-dimethyl-5-pyrazolone-4-aminomethane sodium sulfonate.

6. Composition of matter comprising in aqueous solution an alkoxyphenol and a water-soluble 1-phenyl-2.3-dimethyl-5-pyrazolone-4-methylamino-sulfonate or sulfinate.

7. Composition of matter comprising in aqueous solution an alkoxyphenol and a 1-phenyl-2.3-dimethyl-5-pyrazolone-4-methylamino-alkali metal sulfonate.

8. Composition of matter comprising in aqueous solution an ortho-alkoxyphenol and a water-soluble 1-phenyl-2.3-dimethyl-5-pyrazolone-4-methylamino-sulfonate.

9. Composition of matter comprising in aqueous solution an ortho-alkoxyphenol and a 1-phenyl-2.3-dimethyl-5-pyrazolone-4-methylamino-alkali metal sulfonate.

10. Composition of matter comprising in aqueous solution an alkoxyphenol and a water-soluble 1-phenyl-2.3-dimethyl-5-pyrazolone-4-methylamino-sodium sulfonate.

11. Composition of matter comprising in aqueous solution an ortho-alkoxyphenol and a 1-phenyl-2.3-dimethyl-5-pyrazolone-4-methylamino-sodium sulfonate.

12. Composition of matter comprising in aqueous solution guaiacol and a water-soluble 1-phenyl-2.3-dimethyl-5-pyrazolone-4-aminomethane-sulfonate or -sulfinate.

13. Composition of matter comprising in aqueous solution guaiacol and a 1-phenyl-2.3-dimethyl-5-pyrazolone-4-aminomethane-alkali metal sulfonate or sulfinate.

14. Composition of matter comprising in aqueous solution guaiacol and a 1-phenyl-2.3-dimethyl-5-pyrazolone-4-aminomethane-sodium sulfonate.

15. Composition of matter comprising in aqueous solution guaiacol and 1-phenyl-2.3-dimethyl-5-pyrazolone-4-methylaminomethane-sodium sulfonate.

16. Composition of matter comprising in aqueous albumen-free liver extract solution guaiacol and a 1-phenyl-2.3-dimethyl-5-pyrazolone-4-aminomethane-sodium sulfonate.

17. Composition of matter comprising in aqueous albumen-free liver extract solution guaiacol, quinine-hydrochloride and a 1-phenyl-2.3-dimethyl-5-pyrazolone-4-aminomethane-sodium sulfonate.

WALTER KROPP.